(12) United States Patent  
Rotshtain

(10) Patent No.: US 11,471,752 B2  
(45) Date of Patent: Oct. 18, 2022

(54) COMPUTER-CONTROLLED BOARD GAMES

(71) Applicant: Dov Rotshtain, Netanya (IL)

(72) Inventor: Dov Rotshtain, Netanya (IL)

( * ) Notice: Subject to any disclaimer, the term of this patent is extended or adjusted under 35 U.S.C. 154(b) by 0 days.

(21) Appl. No.: 15/532,509

(22) PCT Filed: Dec. 4, 2015

(86) PCT No.: PCT/IB2015/059353  
§ 371 (c)(1),  
(2) Date: Jun. 2, 2017

(87) PCT Pub. No.: WO2016/088090  
PCT Pub. Date: Jun. 9, 2016

(65) Prior Publication Data  
US 2017/0361209 A1 Dec. 21, 2017

Related U.S. Application Data

(60) Provisional application No. 62/087,245, filed on Dec. 4, 2014.

(51) Int. Cl.  
*A63F 9/24* (2006.01)  
*A63F 3/00* (2006.01)  
(Continued)

(52) U.S. Cl.  
CPC ............ *A63F 3/00643* (2013.01); *A63F 3/04* (2013.01); *A63F 3/0415* (2013.01); *G06F 3/0304* (2013.01); *G09B 19/22* (2013.01); *A63F 2003/0418* (2013.01); *A63F 2009/2435* (2013.01); *A63F 2009/2457* (2013.01); *A63F 2009/2486* (2013.01)

(58) Field of Classification Search  
CPC .......... A63F 13/21; A63F 13/23; A63F 13/25; A63F 13/40; A63F 13/50  
See application file for complete search history.

(56) References Cited

U.S. PATENT DOCUMENTS 5,239,373 A * 8/1993 Tang ................... H04N 1/00283  
                                                      348/14.01  
5,790,114 A * 8/1998 Geaghan ............... G06F 3/0488  
                                                      178/18.03  
(Continued)

FOREIGN PATENT DOCUMENTS

CN        102044195 A      5/2011  
WO          9603188 A1      2/1996

OTHER PUBLICATIONS

EP Application # 15864754 Search Report dated Jul. 17, 2018.  
(Continued)

*Primary Examiner* — Milap Shah  
*Assistant Examiner* — Jason Pinheiro  
(74) *Attorney, Agent, or Firm* — Kligler & Associates Patent Attorneys Ltd

(57) ABSTRACT

Methods and apparatus are described for preserving and improving board games by changing the game board from a passive cardboard board to a dynamic computer controlled board while keeping the other tangible parts of the game unchanged—dice, game pieces, etc. The inherent values of board games are preserved, while improving the attractiveness of board games by using computing systems and advanced technologies.

10 Claims, 4 Drawing Sheets

(51) Int. Cl.
*G06F 3/03* (2006.01)
*A63F 3/04* (2006.01)
*G09B 19/22* (2006.01)

(56) References Cited

U.S. PATENT DOCUMENTS

| | | | | |
|---|---|---|---|---|
| 5,853,327 | A * | 12/1998 | Gilboa | A63F 13/235 |
| | | | | 273/237 |
| 6,568,683 | B1 | 5/2003 | Harpaz | |
| 6,690,156 | B1 * | 2/2004 | Weiner | G06T 7/70 |
| | | | | 273/237 |
| 6,761,634 | B1 * | 7/2004 | Peterson | A63F 13/06 |
| | | | | 463/30 |
| 7,474,983 | B2 * | 1/2009 | Mazalek | G06F 3/011 |
| | | | | 702/152 |
| 8,199,170 | B2 * | 6/2012 | Mishima | G06F 3/0421 |
| | | | | 715/788 |
| 8,368,663 | B2 * | 2/2013 | Izadi | G06F 3/0421 |
| | | | | 713/340 |
| 8,411,070 | B2 * | 4/2013 | Boer | G06V 40/1318 |
| | | | | 345/173 |
| 8,416,206 | B2 * | 4/2013 | Carpendale | G06F 3/04883 |
| | | | | 345/173 |
| 8,602,857 | B2 * | 12/2013 | Morichau-Beauchant | |
| | | | | A63F 3/00643 |
| | | | | 463/9 |
| 8,827,722 | B1 * | 9/2014 | Cannata | B43K 23/001 |
| | | | | 434/408 |
| 8,970,540 | B1 * | 3/2015 | Hebenstreit | G06F 3/0414 |
| | | | | 345/174 |
| 2002/2103024 | | 8/2002 | Jeffway | |
| 2005/0162381 | A1 * | 7/2005 | Bell | G06F 3/011 |
| | | | | 345/156 |
| 2006/0050061 | A1 * | 3/2006 | Aiken | G06F 1/1626 |
| | | | | 345/173 |
| 2007/0015588 | A1 * | 1/2007 | Matsumoto | A63F 13/214 |
| | | | | 463/43 |
| 2009/0309841 | A1 * | 12/2009 | Wilson | G06F 3/0304 |
| | | | | 345/173 |
| 2010/0032900 | A1 | 2/2010 | Wilm | |
| 2010/0148438 | A1 | 6/2010 | Amos | |
| 2012/0049453 | A1 | 3/2012 | Morichau-Beauchant et al. | |
| 2012/0052934 | A1 * | 3/2012 | Maharbiz | A63F 3/00214 |
| | | | | 463/9 |
| 2013/0217496 | A1 * | 8/2013 | Olkin | A63F 3/00075 |
| | | | | 463/32 |
| 2013/0278550 | A1 * | 10/2013 | Westhues | G06F 3/03545 |
| | | | | 345/174 |

OTHER PUBLICATIONS

EP Application # 15864754 Office Action dated Apr. 28, 2020.
EP Application # 15864754 Summons dated Dec. 11, 2020.
Tamannai, "ePawn Arena Digital Gaming Board—elekronischer Brettspiel-Bildschirm—CES 2012", p. 1,YouTube Clip, Jan. 14, 2012, retrieved from internet at https://www.youtube.com/watch?v=hS2a9BodvUk.
Woo et al., "TARBoard: Tangible Augmented Reality System for Table-top Game Environment," Proceedings of PerGames'05—Second International Workshop on Pervasive Gaming, ACM, pp. 1-6, Jan. 2005.
PCT Search Report and Written Opinion PCT/IB2015/059353, dated Mar. 31, 2016.

* cited by examiner

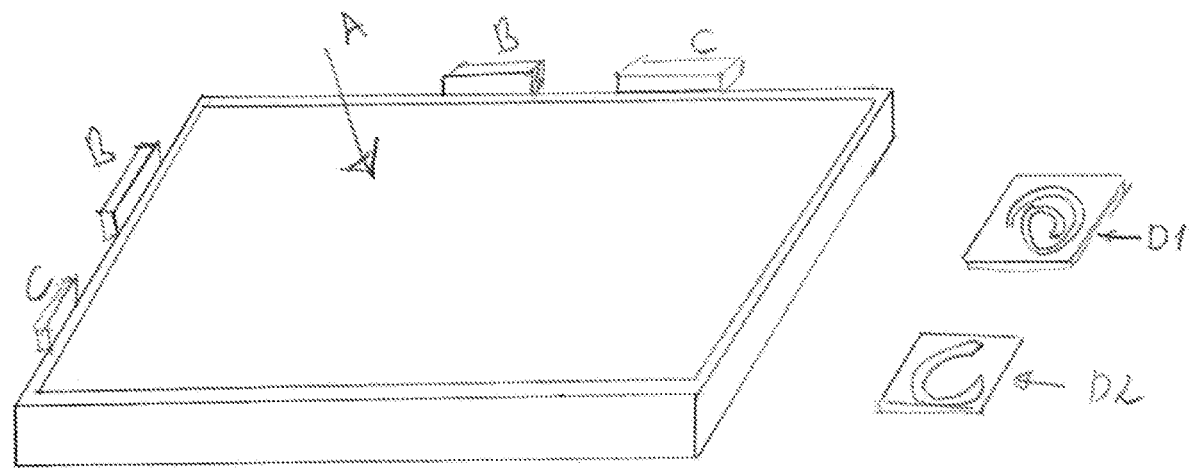
Figure 6
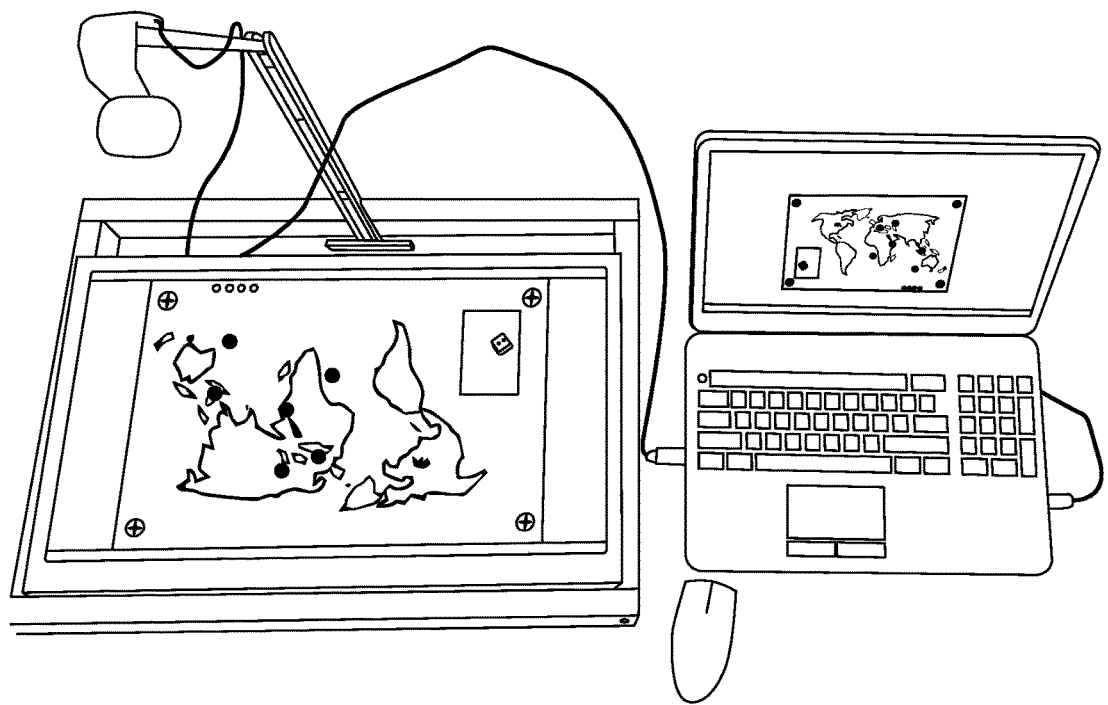

COMPUTER-CONTROLLED BOARD GAMES

FIELD OF THE INVENTION

The present invention relates generally to board games, and particularly to methods and apparatus for preserving and improving board games by changing the game board from a passive cardboard board to a dynamic computer controlled board.

BACKGROUND OF THE INVENTION

The current global trend for educational games has shifted from the old and familiar board games to computer games for a wide variety of reasons.

Unfortunately, in moving to computer games, a number of educational elements inherent in board games are lost. In addition, players are exposed to some of the negative aspects of computer games. (See table)

| Board Games | Computer Games |
|---|---|
| A tangible game that is connected to the surrounding environment. | A virtual game that disconnects from reality, transferring one to an imaginary world. |
| A group game that improves social skills. | Replaces real life friends with virtual ones. |
| Slow paced, improves knowledge immersion. | Fast paced, harms knowledge immersion. |

SUMMARY OF THE INVENTION

The present invention seeks to provide an improved computer-controlled board game, as is described more in detail below.

BRIEF DESCRIPTION OF THE DRAWINGS

The present invention will be understood and appreciated more fully from the following detailed description, taken in conjunction with the drawing in which:

FIG. 5 is a simplified illustration of the game board, in accordance with an embodiment of the present invention, wherein A is the game board, B the transmitter, C the detector, and D metal chips with different magnetic fields.

FIG. 6 is a simplified illustration of the game board, in accordance with an embodiment of the present invention, showing the board connected to the PC.

DETAILED DESCRIPTION OF EMBODIMENTS

In general, in accordance with an embodiment of the present invention, the game is characteristically, methodically and content-wise similar to present board games; for example, there is a game board, dice or counters are placed on the board according to the type of game, and the participants sit around the board (usually 2-6 players).

One of the significant differences between existing games and the present invention is that in the present invention, the game board is dynamic and controlled by the computer as opposed to being passive in the regular board game.

In the present invention, the game board includes a computer-controlled surface. The data from the game board is transferred to the computer processor, and the processor processes the data. After data processing, the computer manages the game using an audio system and visual presentation which is screened on the dynamic game board by using video projector devices and the like.

Playing through a network—this method allows the game to use game pieces from a number of players over a network. Each player plays the board game with real pieces and their opponents' pieces are displayed on the game board through the computer.

The game board is a dynamic board controlled by the computer system. The application of the dynamic surface can be applied using two different methods.

Figure 1:
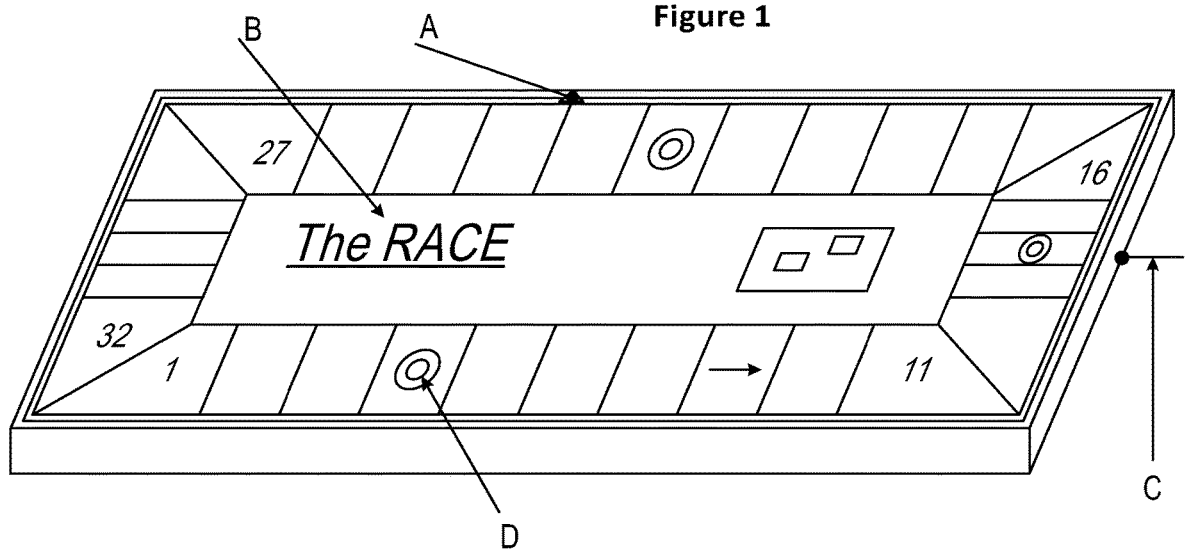
FIG. 1 is a simplified illustration of a board game, in accordance with an embodiment of the present invention, wherein A is the computer screen, B is the image board game, C is the communication line and D—the game pieces.

The first method uses a computer screen as seen in FIG. 1. The computer screen is presented horizontally with its upper surface made of a transparent material, such as but not limited to, transparent thermoplastic, e.g., polymethyl methacrylate (PMMA). The transparent board filters light to improve the quality of photography and protects the screen from wear due to the game pieces. The computer and the computer screen form one integral unit, which saves on space and is easily transported from one place to another. Players can write on this screen with a marker, such as an erasable marker (water-based marker erasable by wiping with a cloth and the like). This is very useful for educational or thinking games, like memory games or SUDOKU.

Figure 2:
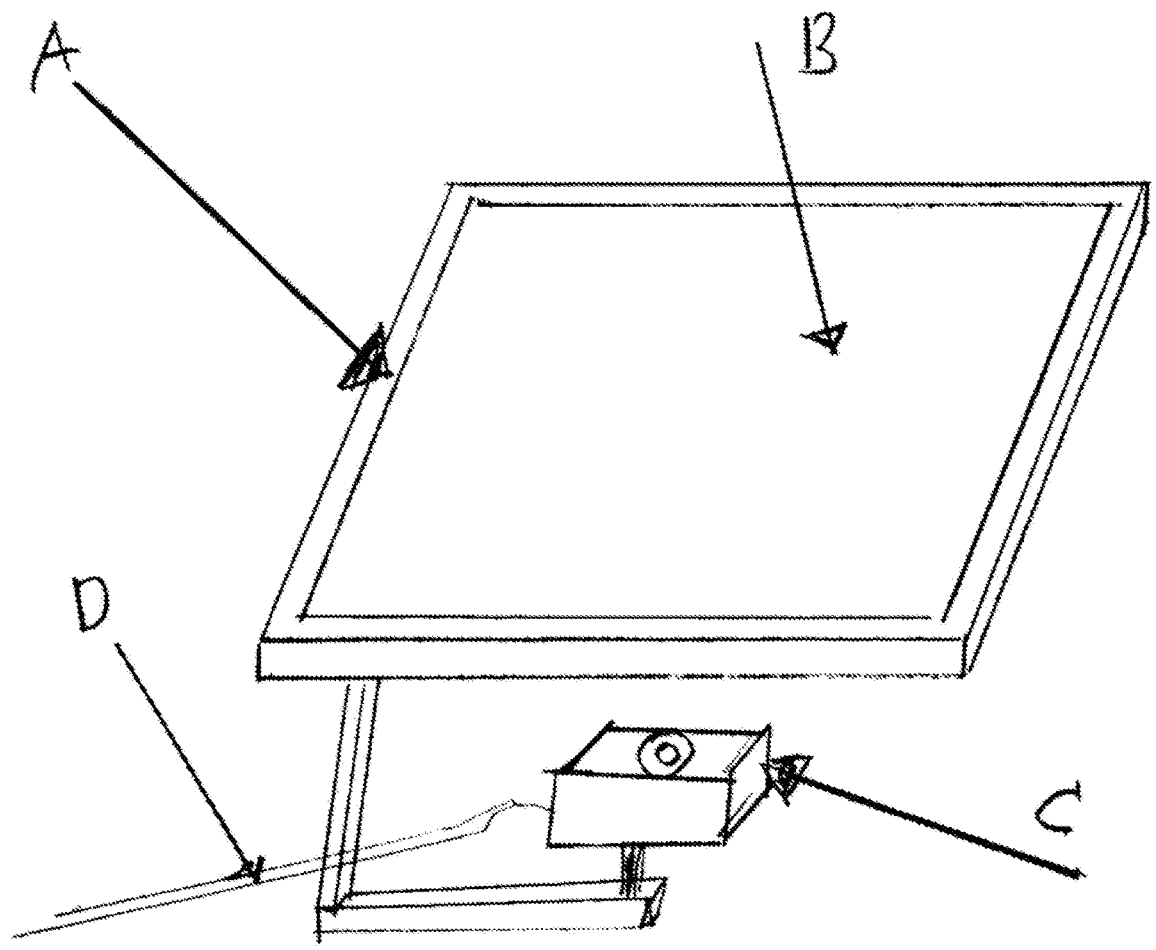
FIG. 2 is a simplified illustration of a fabric screen, in accordance with an embodiment of the present invention, wherein A is the fabric screen, B is a white surface, C is the projector and D is the communication line.

The second method uses a screen 1 on a frame 2, as seen in FIG. 2. For example, the frame or screen may be made of white cloth, woven in medium density. The game picture image is projected by a projector 3 on the screen on the underside of the screen in order not to disrupt the game. The scene shifts from the PC (personal computer) 4 as a negative. Here again, the computer and screen form one integral unit, which saves on space and is easily transported from one place to another.

Figure 3:
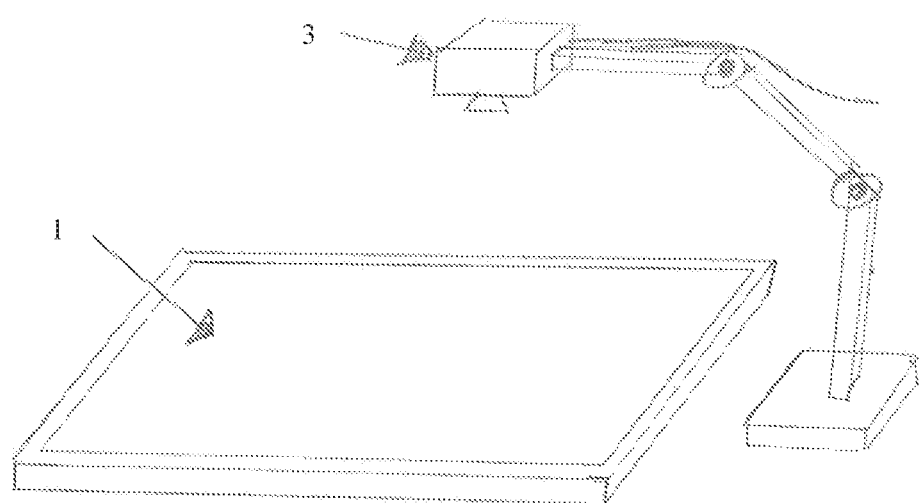
FIG. 3 is a simplified illustration of the game board, in accordance with an embodiment of the present invention, wherein A is the game board, B is the camera, C is the flexible arm, and D is the communication line.

The data transfer from the board game to the computer can be done by a camera or sensors. For example, the camera can be located on the upper side of the board, as seen in FIG. 3. The camera can be a standard webcam, which is located above the game board at about 50 cm above the center of the board. The camera is mounted on a flexible arm to allow optimal direction of the camera. The function of the camera is to convey what is happening on the board to a computer for data processing.

Figure 4:
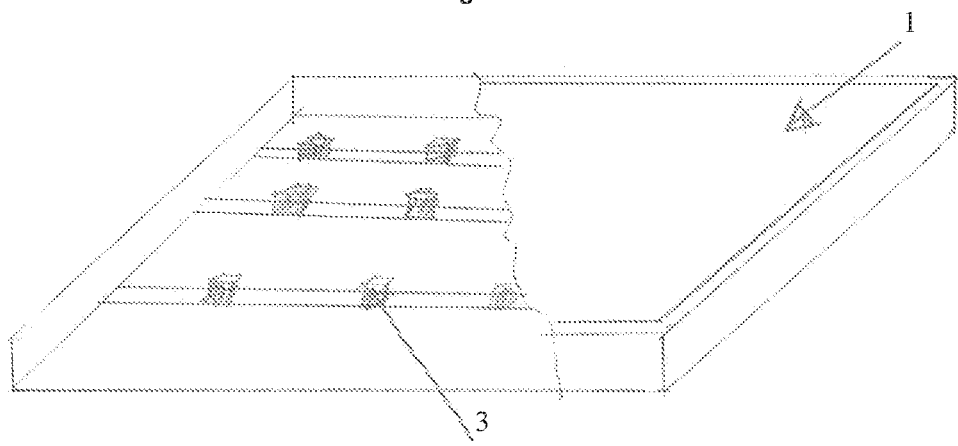
FIG. 4 is a simplified illustration of a micro-camera located at the bottom side of the board, in accordance with an embodiment of the present invention, wherein A is the game board made from a transparent computer screen and B is the micro-camera(s).

In another embodiment shown in FIG. 4, a micro-camera is located at or on the bottom side of the transparent computer screen game board. Multiple cameras with wide angle lenses may be located at the bottom side under the screen; this permits free movement of players or pieces around the game board.

Illumination of the game board, whether above or below the game board, may include continuous or pulsed illumination or a combination of both. The speed of the pulsed illumination may be such that the human eye does not discern the pulses. In other words, the pulsed illumination may be at the flicker fusion threshold, which is the frequency at which an intermittent light stimulus appears to be completely steady to the average human. This gives the invention the advantage of changing scenery on the game board or identifying players without causing discomfort to the player's eye.

In another embodiment shown in FIG. 5, sensors B and C are used. Each part of the game contains a metal chip which marks each piece D1, D2 with a different resonant frequency. On each side of the board there will be sensors and transmitters for electromagnetic waves at changeable frequencies. The detectors transfer information to the computer to identify the location of each part. The pulses from the transmitters are for short periods of time in order not to deviate from acceptable amounts of radiation.

Figure 7:
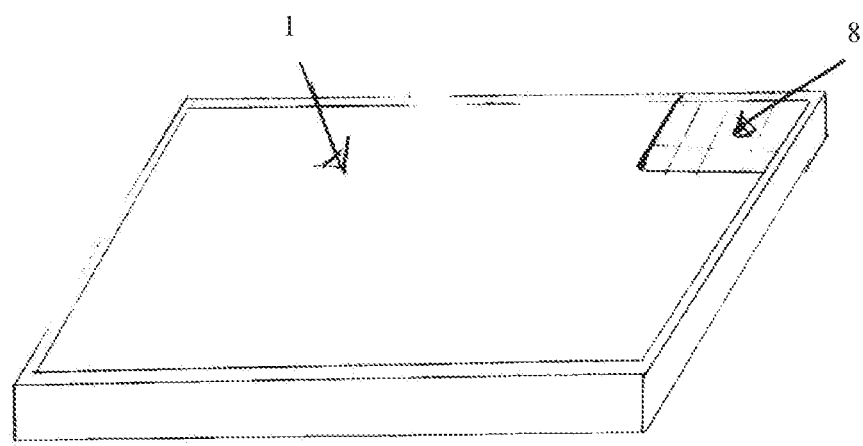
FIG. 7 is a simplified illustration of the game board, in accordance with an embodiment of the present invention, using a game board and tablet.

In FIG. 7, the embodiment includes game board 1 and a tablet 8, for displaying or inputting moves or other information for the game.

The game is managed by computer. It is possible to use the game on a home computer as well as a smartphone or tablet, etc.

Stages of the game:
Stage 1: Preparing the computer for the game:
First the computer is loaded with the following elements:
a. General software for board games.
b. Designated software for a given game.
c. Data defined by the players.
Stage 2: Game system approval regulator:
The game board is divided by virtual computer squares defined by latitude and longitude axes.

The PC sets the game data using pre-defined parameters. For example, the PC defines distributed squares with check points at the ends of the board and the center.

The PC sets the optical image quality with reference colors scattered on the board.

If any setting is not possible, the software alerts the users and provides instructions to correct the situation.

Stage 3 Duration of the game:
The following data is stored on the computer:
a. Rules and game settings.
b. Settings entered by the players.
c. Information or positions attributed to any virtual square on the game board.
d. The information obtained from the camera or the sensor on the game board.
e. Games that use dice throwing—data is read and received by the camera or sensor and stored on the computer.
Stage 4—Managing the game
According to the data and cross-referencing, computer operation and managing the game may be implemented in the following ways:
a. Check correctness of moves—send an alert message to the players when a wrong move is made.
b. Test duration of the course—if there is a deviation, send an alert message to the players.
c. Trivia games—validated answers assigned to each virtual square.

d. Financial games (like Monopoly)—Change market conditions and give instructions in accordance with the decision of the computer.
e. Additional visual and other effects to improve attractiveness and enjoyment of the game.
f. The option to develop many types of games on the basis of this method has limitless possibilities.
5. Implementation in games:
With the methods of the invention, most board games can be upgraded as outlined in the previous sections. In addition, new families of games can be developed which were not possible with the previous board games.

An example is a relatively simple game called "Geographical knowledge of the Earth". This example illustrates some of the capabilities and benefits of integrating a board game with a computer system.

The game is a competitive game designed for 2 to 4 players.

The game board is a blank map of the Earth. The objective is to reach the South Pole from the North Pole. The game progresses with the roll of dice. The traffic is routed using a crisscross pattern to cover the maximum amount of important and interesting points on the map. The progress is dependent upon providing correct answers. Correctness of answers is tested by the computer.

Advantages of combining with the computer include:
a. Matching the game to a wide range of ages and levels. The computer makes sure the competition is fair by setting different levels for the players based on their skills, knowledge and experience (e.g., setting a difficult level for an adult as opposed to an easy level for a child playing against the adult).
b. Adjustments can be made in the following ways:
Identifying objectives by choosing levels of difficulty.
Details of the data for each point on the map from identifying places to historical events.
Time allocation process for each move.
An added option is to make the game a memory game and/or identification of destinations visually or by other information.
6. Additional options for implementing the method:
All parts of the system may be consolidated into a single unit as seen in FIG. 7.

The game board may be a transparent computer screen. The camera may be located under the screen as described above. The computer may be like a tablet located at the edge of the screen. One advantage of this example is easy assembly and play.

In another example, the playing surface is a printed cardboard, as in existing games. This has the advantage of a significantly lower price, however, the disadvantage is that an essential part of the game is not reflected and the game board is passive.

Persons can become the playing pieces by standing or moving on a large screen. The players are identified by markers worn by the players or any other suitable method.

What is claimed is:
1. A method for playing a game comprising:
using a computer screen as a game board, wherein said computer screen is made of a transparent material and adapted for writing thereon, said computer screen being coupled to a computer processor;
using said computer processor to display by means of pulsed illumination of said computer screen, which is the game board, images of an educational or thinking game;

writing on a top surface of said computer screen, which is the game board, with an erasable marker in response to said images of said educational or thinking game; and transferring data from said computer screen, which is the game board, to said computer processor with multiple cameras with wide angle lenses located under said computer screen.

2. The method according to claim 1, wherein said images are projected on an underside of said computer screen below said top surface.

3. The method according to claim 1, wherein said computer processor and said computer screen form one integral unit.

4. The method according to claim 1, and comprising placing game pieces on said top surface, wherein locating the cameras under said computer screen permits free movement of said game pieces around the game board.

5. The method according to claim 1, wherein said pulsed illumination is pulsed at a speed such that a human eye does not discern the pulses.

6. Apparatus for playing a game comprising:
a computer screen made of a transparent material and having a top surface adapted for writing thereon;
a computer processor coupled to said computer screen and configured to display by means of pulsed illumination of said computer screen images of an educational or thinking game for which said computer screen is the game board; and
multiple cameras with wide angle lenses located under said computer screen and configured to transfer data to said computer processor with respect to writing by players of said educational or thinking game on said top surface of said computer screen, which is the game board.

7. The apparatus according to claim 6, wherein said images are projected on an underside of said computer screen below said top surface.

8. The apparatus according to claim 6, wherein said computer processor and said computer screen form one integral unit.

9. The apparatus according to claim 6, and comprising game pieces, which are adapted to be placed on said top surface, wherein locating the cameras under said computer screen permits free movement of said game pieces around the game board.

10. The apparatus according to claim 6, wherein said pulsed illumination is pulsed at a speed such that a human eye does not discern the pulses.

\* \* \* \* \*